United States Patent [19]
Rodin

[11] 3,950,637
[45] Apr. 13, 1976

[54] ARTIFICIAL LIGHT SOURCE AND ATTACHED GROWING AREA

[76] Inventor: Vincent L. Rodin, 503 E. 72nd St., New York, N.Y. 10021

[22] Filed: Oct. 11, 1974

[21] Appl. No.: 514,094

[52] U.S. Cl. .................. 240/10 P; 47/26; 47/35; 240/2 R; 240/78 E; 248/27.8; 248/318
[51] Int. Cl.² .................. F21S 1/02; A01G 13/00
[58] Field of Search ............ 240/10 R, 46.41, 10 P, 240/46.45, 78 R, 78 E, 78 LG, 78 LH, 135, 136, 142, 149, 150, 2 AD, 2 LC, 92, 102; 47/26, 28, 30, 34, 35, 41.11, DIG. 6; 248/27.8, 317, 318

[56] References Cited
UNITED STATES PATENTS

| | | | |
|---|---|---|---|
| 1,156,454 | 10/1915 | Bayley | 240/78 LH |
| 1,228,969 | 6/1917 | Robb | 240/149 |
| 1,263,391 | 4/1918 | Eickemeyer | 240/2 LC |
| 1,334,199 | 3/1920 | Weiseman | 240/149 X |
| 2,437,522 | 3/1948 | Handler | 240/46.41 X |
| 3,300,634 | 1/1967 | Liberman | 240/46.41 X |

FOREIGN PATENTS OR APPLICATIONS

| 75,741 | 10/1949 | Norway | 248/27.8 |
|---|---|---|---|

Primary Examiner—Joseph F. Peters, Jr.
Attorney, Agent, or Firm—Bauer, Amer & King

[57] ABSTRACT

An artificial light source and container apparatus for growing plants. The apparatus includes a paraboloid dome defined by a discharge aperture. A light source is positioned in the dome preferably at the focal point thereof. A support carriage and platform is positioned in the discharge region of the dome and is adapted for alignment along the central longitudinal axis of the dome. A container is hung from the platform to intercept substantially all of the light from the light source.

8 Claims, 4 Drawing Figures

ARTIFICIAL LIGHT SOURCE AND ATTACHED GROWING AREA

BACKGROUND OF THE INVENTION

This invention relates to a light for plant growth. More particularly the present invention relates to an artificial light source and attached growing area with means for aligning the latter with respect to the former.

Often times it is either necessary or decorative to grow plants or various flora in environments where natural sunlight is unable to or intentionally prevented from reaching the growing area. For example, many botanical laboratories conduct experiments where it is necessary to use an artificial light source instead of the sun. And, for decorative purposes it may be desirable to place plants in areas that are unaccessible to natural light.

Conventionally, it has been the practice to use artificial fluorescent or incandescent means simulative of natural sunlight and operably placed so as to take advantage of the phototropic response of plants. With conventional apparatus then, it is necessary to flood the area with the artificial growing light since usually the artificial light source is sold as light source per se and does not include means for directing the light toward a specific growing area. Moreover, conventional apparatus have been devoid of means for convenient orientation or alignment of the growing area with respect to the direction of maximum light intensity.

Then, too, certain precautions need be taken when using artificial light. If the source is positioned too close to the growing area, the plant, if grown, might die from overexposure and heating from the light source. Or, when the source is used for germination and if likewise too close to the growing area, the soil becomes relatively hot preventing germination of the seeds.

The present invention is designed to provide a simplified inexpensive and efficient means for directing the radiation from an artificial light source onto an attached or suspended growing region.

Generally, the present invention includes a reflective hood or dome into which an artificial light source is placed. The hood is paraboloid in shape and includes an open circular discharge area through which the light passes as it leaves the reflector. A support carriage is positioned in the discharge area by being supported in and near the rim region of the paraboloid. The support carriage includes a central coupling easily aligned along the central longitudinal axis of the parabolic dome. A growing area or container is typically of spherical shape and is adapted for demountable attachment to the central coupling. The outboard apex region of the paraboloid contains an attachment preferably in the form of an eyelet so that the entire apparatus including the paraboloid and complimentary circular growing area can be conveniently supported by a chain, rope or the like from a ceiling implanted "swag hook."

A particularly novel feature of the present invention is the ability of the central coupling to self-align along the central longitudinal axis of the reflective paraboloid. Moreover, since the paraboloid almost completely surrounds the artificial light source and includes a reflective surface, the light source can be of reduced rating for a given light intensity.

It is therefore an object of the present invention to provide an artificial light source used to grow various botanical specimens.

It is another object of the present invention to provide an artificial source including means to support and suspend botanical specimens.

It is a further object of the present invention to provide a container for use with an artificial light source with the container adapted for supporting and growing various flora and the like wherein the position of the container with respect to the light source is determined by a self-aligning coupling.

It is yet another object of the present invention to provide a simplified and decorative artificial light source and attached growing area fabricated from inexpensive and readily available standard hardware.

It is a still further object of the present invention to provide an artificial light source particularly adaptable for growing various plants or cultures that includes a reflective surface designed to redirect some of the radiated light towards the growing area to thereby effect an increased efficiency and corresponding decrease in power consumption for a given light intensity.

Other objects and present features of the present invention will become apparent from the following detailed description considered in connection with the accompaning drawings. It is to be understood however that the drawings are designed for purposes of illustration only and not intended as a definition of the invention.

BRIEF DESCRIPTION OF THE FIGURES

In the drawings wherein the same reference numeral denotes the same element throughout the several views.

DESCRIPTION OF INVENTION

Figure 1:
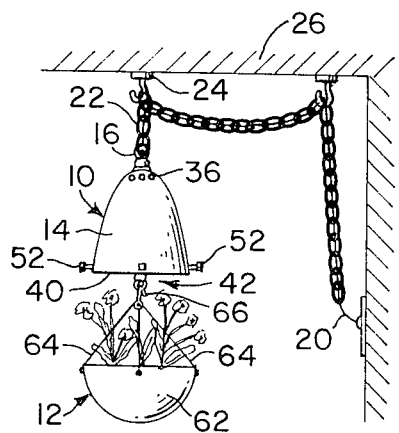
FIG. 1 is a side view of the present invention showing same being suspended from an interior wall by means of a so called "sky hook;"
Figure 2:
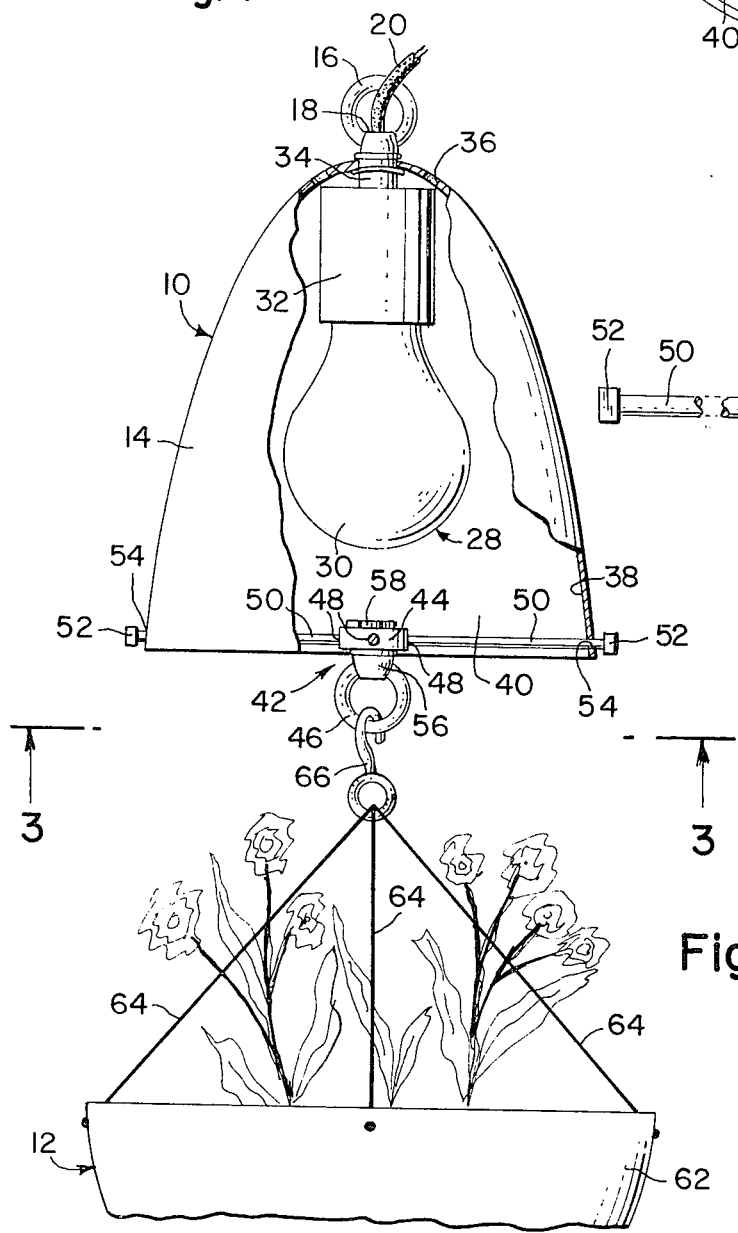
FIG. 2 is an enlarged view of FIG. 1 with part of the paraboloid dome broken away to reveal the light source means.

Referring now to the drawings there is shown the inventive artificial light source and attached container with the light source and associated structure generally indicated by reference numeral 10, and the attached container generally indicated by reference numeral 12. Structure 10 includes a dome or hood 14 generally in the shape of a paraboloid. An aperture 15 is disposed through the apex or top portion of hood 14. An eyelet 16 is pivotably attached to one and the outboard end of a neck 34 with the neck being captured in aperture 15 by means of friction clasp 19 as indicated in FIG. 2. Both the eyelet and the neck are formed with a complimentary aperture 18 through which passes a power cord 20 to supply power to an artificial light source as described hereinafter. Structure 10 can then be supported by various means. For example, as shown in FIG. 1 one end of chain 22 is coupled to eyelet 16. The chain is then supported at an intermediate point by a swag hook 24 or other equivalent means in ceiling 26.

An artificial light source means generally indicated by reference numeral 28 is positioned within dome 14 as seen in FIG. 2. Preferably, artificial light source means 28 will comprise an incandescent light bulb 30 having an output in the visible light region and a bulb socket 32. Bulb socket 32 is attached to and is supported internally in dome 14 on the other end of neck 34. The positioning of bulb 30 in dome 14 is not critical, yet the bulb filament should be positioned in dome 14 approximately at the focal point of the paraboloid. Further, the apex region of the paraboloid includes aperture means 36 allowing convective air currents to pass therethrough and cool the apparatus. A reflective surface 38 is disposed along the internal periphery of dome 14. The composition of surface 38 might consist of various materials, for example, surface 38 could be mirrored or silvered or indeed merely painted white. Parabolic dome 14 includes a discharge region or aperture 40 through which the radiation from bulb 30 passes.

Figure 3:
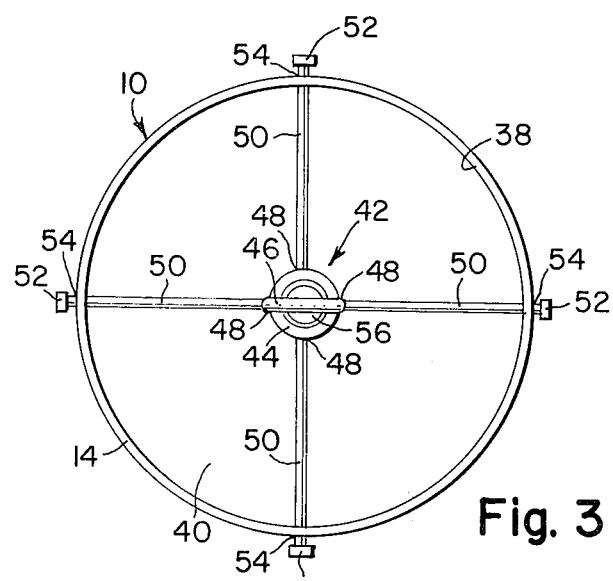
FIG. 3 is a view taken along the line 3—3 of FIG. 2 and looking in the direction of the arrows.

A support carriage generally indicated by reference numeral 42 is aligned centrally in discharge aperture 40. Support carriage 42 includes the central member or platform 44 and attached eyelet or ring 46. When dome 14 is suspended, from eyelet 16, ring 46 will be disposed downwardly as viewed in FIG. 2. Carriage 44 includes alignment apertures 48 for threadably receiving alignment studs. As particularly shown in FIGS. 2 and 3, the positioning of apertures 48 around platform 44 quadrates the platform so that when a stud engages its associated aperture, the longitudinal axis of each stud is positioned approximately 90° with respect to an adjacent stud.

A plurality of alignment apertures or bores 54 are positioned through the wall of dome 14 with a respective aperture 54 in registration with a complimentary aperture 48. A cap 52 is disposed on the other end of each stud as shown. Each cap 52 interferes with the adjacent regions of respective apertures 54 and so the caps act as stops for the studs. Hence, a respective stud 50 will be confined in and slide through aperture 54 to threadably engage an aperture 48 in platform 44. With this construction and as the leading ends of studs 50 engage a respective aperture 48, platform 44 aligns in discharge region 40. It is also apparent that as the studs concomitantly engage associated apertures 48, the platform and studs in effect become locked in the discharge region as the studs remain captured in dome alignment bores 54. The caps 52 may be integral with the stud 50.

Figure 4:
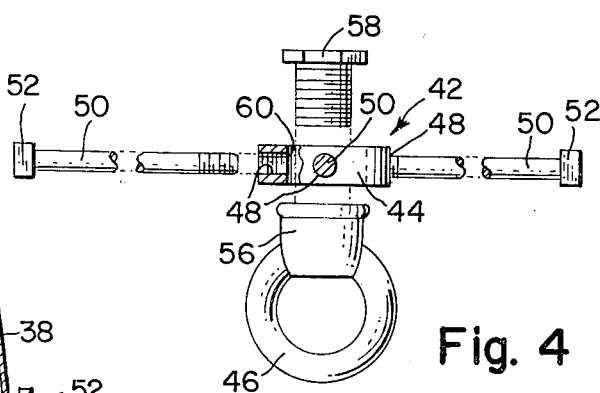
FIG. 4 is an enlarged view of the support carriage and coupling of the present invention showing same removed from engagement with the paraboloid reflector.

Eyelet 46 is attached to platform 44 by various means. Preferably and as seen in FIG. 4, a head 56 is defined on one end by a bore for capturing the eyelet and on the other end the cap is defined by shoulder portion and threaded region, the threaded region not shown. The threaded region of cap 56 is designed to threadably engage a coupling element 58. A passageway 60 is centrally disposed in platform 44 with the axis of the passageway disposed substantially orthogonal to the plane defined by rods 50. Passageway 60 allows coupling 58 to slide therethrough and engage the threaded region of member 56 to threadably lock the last mentioned member to the platform. Although eyelet or ring 46 is captured in member 56, the ring 46 is pivotal therein. Of course other means may be used to attach ring 46 to platform 44. For example, member 56 might be soldered or tackwelded to platform 44, indeed, it is possible to adhesively secure member 56 to the platform.

Plant container means 12 is shown having a semi-spherical shape and open face. container 12 has attached thereto suspension means, typically in the form of guy wires 64. As seen in FIG. 2 respective ends of guy wires 64 are attached to holder 62 at respective points that are 90 degrees apart along the rim of the holder. The other ends of guide leads 64 merge and are attached to a hook element 66. Hook element 66 is designed to detachably mount through ring 46 as seen in the last mentioned figure.

Operation of the inventive device occurs by filling container 62 with soil and the desired plant species. Power is applied to artificial light source means 28 through cord 20 causing bulb 30 to radiate light energy preferably at a frequency particularly suitable for growing plants or cultures as the case may be. Support carriage 42 aligns centrally in discharge region 40 when assembled as referred to above. Some of the light from means 28 will strike reflective surface 38 and will be redirected towards region 40 and onto the opposed face of holder 62. The other portion of light from means 28 shines directly on this opposed face of container 62. Guy wires 64 suspend container 62 so that the opposed face of the latter intercepts the rays emanating from dome 14 broadside or at right angles to the direction of the rays and thereby utilizes maximum efficiency of the artificial light source. Ring 46 pivots relative to cap 56. Similarly, hook 66 pivots relative to ring 46 so that with this construction and when the apparatus is suspended as seen in FIG. 1, holder 62 will remain upright during displacements of dome 14.

While only a single embodiment of the present invention has been shown and described, it is to be understood however that many changes and modifications may be made hereto without departing from the spirit and scope thereof.

What I claim as new and desire to secure by letters patent is:

1. Light source apparatus particularly adapted for growing plants, comprising:
   dome means substantially of paraboloid shape and having a discharge aperture;
   light source means positioned in said dome means whereby the light therefrom is substantially directed to radiate through said aperture;
   a support carriage including a platform positioned in said discharge aperture and adapted for alignment with respect to the central and longitudinal axis of said parabolic dome and, a plurality of rods, each one of which is defined by a cap on one end and threaded leading portion on the other, and wherein said platform includes a plurality of threaded apertures adapted to threadably recieve the respective leading and threaded ends of said rods, said dome further including alignment bores through the wall thereof in the region of said discharge aperture wherein each of said alignment bores is designed to receive a respective one of said rods whereby said caps act as stops for said rods as same engage said respective threaded apertures of said platform to orient said platform with respect to the central longitudinal axis of said parabolic dome; and,
   means to couple container means to said platform below said light source means so as to intercept substantially all of the light radiating from said light source means.

2. The apparatus of claim 1 wherein said light source means is an incandescent light source.

3. The apparatus as in claim 1 wherein said paraboloid dome has an interior surface comprised of light reflecting material.

4. The apparatus of claim 1 wherein said container means includes a plant container and wherein said coupling means includes support means operable to suspend said plant container from said platform.

5. The apparatus of claim 4 wherein said support means includes a hook member and guy wires, said wires coupling said hook member to said plant container.

6. The apparatus of claim 5 wherein said platform further includes eyelet means to demountably engage said hook means.

7. The apparatus of claim 6 wherein the apex region of said paraboloid dome further includes an aperture array through which heated air can pass for convective cooling of the apparatus.

8. the apparatus of claim 7 wherein the outboard surface of the apex region of said paraboloid dome includes means for supporting said dome so that said discharge aperture thereof faces downwardly.

* * * * *